(12) United States Patent
Shimbo et al.

(10) Patent No.: US 11,938,930 B2
(45) Date of Patent: Mar. 26, 2024

(54) VEHICLE CONTROL APPARATUS

(71) Applicant: TOYOTA JIDOSHA KABUSHIKI KAISHA, Toyota (JP)

(72) Inventors: Yuto Shimbo, Toyota (JP); Tsunekazu Yasoshima, Nagoya (JP); Chen Xi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 315 days.

(21) Appl. No.: 17/587,436

(22) Filed: Jan. 28, 2022

(65) Prior Publication Data

US 2022/0242405 A1    Aug. 4, 2022

(30) Foreign Application Priority Data

Feb. 1, 2021   (JP) ................. 2021-014210

(51) Int. Cl.
*B60W 30/09* (2012.01)
*B60W 30/095* (2012.01)
*B60W 40/105* (2012.01)
*G01S 13/42* (2006.01)
*G01S 13/58* (2006.01)
*G01S 13/931* (2020.01)

(52) U.S. Cl.
CPC ........ *B60W 30/09* (2013.01); *B60W 30/0956* (2013.01); *B60W 40/105* (2013.01); *G01S 13/42* (2013.01); *G01S 13/584* (2013.01); *G01S 13/931* (2013.01); *B60W 2420/408* (2024.01); *B60W 2554/4029* (2020.02); *B60W 2554/80* (2020.02); *G01S 2013/932* (2020.01); *G01S 2013/93271* (2020.01)

(58) Field of Classification Search
CPC ............ B60W 30/09; B60W 30/0956; B60W 40/105; G01S 13/42; G01S 13/584
See application file for complete search history.

(56) References Cited

U.S. PATENT DOCUMENTS

| 2011/0166744 | A1* | 7/2011 | Lu ................... B60T 8/1755 701/1 |
| 2015/0204971 | A1 | 7/2015 | Yoshimura et al. |
| 2021/0237721 | A1* | 8/2021 | Shimbo ............ B60W 30/0956 |
| 2021/0253093 | A1* | 8/2021 | Morotomi .............. G08G 1/166 |

FOREIGN PATENT DOCUMENTS

| JP | 2015-137915 A | 7/2015 |
| JP | 2019-002689 A | 1/2019 |
| JP | 2020-119183 A | 8/2020 |

* cited by examiner

*Primary Examiner* — Tan Q Nguyen
(74) *Attorney, Agent, or Firm* — Sughrue Mion, PLLC

(57) ABSTRACT

A vehicle control apparatus selects, as a first group, objects in a predetermined area from objects included in object information, selects, as a second group, an upper limit number of the objects from the first group in descending order of a priority value when the number of the objects of the first group is greater than the upper limit number, and executes a collision avoidance control when an index value satisfies a predetermined condition. The priority value represents a probability that the own vehicle collides with the object. The apparatus reduces the priority value of a particular object of the first group when the moving speed of the own vehicle is equal to or lower than a moving speed threshold. The particular object is an object which is deemed to have a moving speed lower than a moving speed of a four-wheel vehicle.

6 Claims, 10 Drawing Sheets

| DETECTION START POINT OF TIME | Rd ← Rd-ini |
|---|---|
| CONTINUOUS DETECTION (EACH TIME PREDETERMINED TIME dt ELAPSES) | Rd ← Rd + Rd0 |
| $Ti \leq Ta$ | Rd ← Rd − Rd1 |
| $Ta < Ti \leq Tb$ | Rd ← Rd − Rd2 |
| $Tb < Ti$ | Rd ← 0 |

FIG.4

VEHICLE CONTROL APPARATUS

BACKGROUND

Field

The invention relates to an apparatus which detects an object around an own vehicle and controls the own vehicle.

Description of the Related Art

There is known an apparatus which detects object information on an object around an own vehicle and executes a control of controlling the own vehicle, based on the detected object information (for example, JP 2020-119183 A). Such a control of controlling the own vehicle is, for example, a collision avoidance control.

The collision avoidance control is a control for avoiding a collision of the own vehicle and the object around the own vehicle. The collision avoidance control is, for example a pre-crash safety control (Pre-Crash Safety Control) or a front cross traffic alert control (Front Cross Traffic Alert Control).

A load of calculation processing of determining a collision probability of the own vehicle with the object in the collision avoidance control is great. If the calculation processing is executed to all of the objects included in the object information, the calculation processing may not be completed within a limited time.

Thus, one of solutions for reducing the load of the calculation processing is to select a predetermined number or an upper limit number of the objects from the objects included in the object information. That is, the solution is to limit the number of the objects subject to the calculation processing to the upper limit number. This solution needs to select or pick up the objects which probably collide with the own vehicle. In other words, the solution needs to exclude the objects which probably do not collide with the own vehicle.

SUMMARY

An object of the invention is to provide a vehicle control apparatus which selects the objects which probably collide with the own vehicle from the objects included in the object information.

According to the invention, a vehicle control apparatus comprises at least one first sensor, a second sensor, and an electronic control unit. The at least one first sensor acquires object information on objects in a surrounding area around an own vehicle. The second sensor detects a moving speed of the own vehicle. The electronic control unit is configured to select, as a first object group, objects in a predetermined area from objects included in the object information, select, as a second object group, a predetermined upper limit number of the objects from the first object group in descending order of a priority value when the number as a first number of the objects included in the first object group is greater than the predetermined upper limit number, and execute a collision avoidance control when an index value representing a collision probability that the own vehicle collides with the object included in the second object group, satisfies a predetermined condition. The priority value represents a probability that the own vehicle collides with the object. The electronic control unit is configured to reduce the priority value of a particular object included in the first object group when the moving speed of the own vehicle is equal to or lower than a predetermined moving speed threshold. The particular object is an object which is deemed to have a moving speed lower than a moving speed of a four-wheel vehicle.

When the own vehicle moves at a low speed, the probability that the particular object collides with the own vehicle, is low. Accordingly, the vehicle control apparatus reduces the priority value of the particular object when the moving speed of the own vehicle is equal to or lower than the predetermined moving speed threshold. Thus, when the number of the objects included in the second object group is limited to the predetermined upper limit number, the vehicle control apparatus reduces a probability that the object or the particular object having a low probability of colliding with the own vehicle is selected as the second object group. Thus, the vehicle control apparatus can select the objects each having a high probability of colliding with the own vehicle as the second object group. Thus, the vehicle control apparatus can execute a calculation processing for the collision avoidance control with regard to the objects each having a high probability of colliding with the own vehicle with reducing the load of the calculation processing.

According to an aspect of the invention, the electronic control unit may be configured to calculate a reliability value of each of the objects included in the first object group. In this aspect, the reliability value may represent a probability that the object actually exists. Further, the electronic control unit may be configured to select, as a third object group, the objects each having the reliability value equal to or greater than a predetermined reliability threshold from the first object group when the first number is greater than the predetermined upper limit number. Furthermore, the electronic control unit may be configured to select, as the second object group, the predetermined upper limit number of the objects in descending order of the priority value from the third object group when the number as a second number of the objects included in the third object group is greater than the predetermined upper limit number. Furthermore, the electronic control unit is configured to reduce the priority value of the particular object included in the third object group when the moving speed of the own vehicle is equal to or lower than the predetermined moving speed threshold.

With this aspect of the invention, the vehicle control apparatus can select the second object group from the third object group which includes the objects actually existing with a high probability.

According to another aspect of the invention, the electronic control unit may be configured to select, as a fourth object group, the objects each having the reliability value smaller than the predetermined reliability threshold from the first object group when the first number is greater than the predetermined upper limit number. In this aspect, the electronic control unit may be configured to select the third object group as the second object group when the second number is smaller than the predetermined upper number and thereafter select, as the second object group, a third number of the objects in descending order of the priority value from the fourth object group. Further, the third number may be a difference between the first number and the second number. Furthermore, the electronic control unit may be configured to reduce the priority value of the particular object included in the fourth object group when the moving speed of the own vehicle is equal to or lower than the predetermined moving speed threshold.

With this aspect of the invention, the vehicle control apparatus can preferentially select the second object group from the third object group which includes the objects actually existing with a high probability.

According to further another aspect of the invention, the particular object may be a pedestrian.

According to further another aspect of the invention, the first sensor may be configured to transmit electromagnetic waves and detects the objects by using information on reflection points by which the electromagnetic waves are reflected. In this aspect, the first sensor may be configured to determine the object corresponding to the reflection points as the particular object when a reflection strength at the reflection point is equal to or smaller than a predetermined strength threshold.

According to further another aspect of the invention, the electronic control unit may be configured to acquire the priority value, based on a distance between the own vehicle and a predicted moving route of the object or a distance between the own vehicle and the object.

According to one or more embodiments, the electronic control unit may be realized by a micro-processor programmed to realize one or more functions described in the description of this application. Further, according to one or more embodiments, the electronic control unit may be entirely or partially realized by hardware configured by integrated circuit such as ASIC dedicated to one or more applications.

Elements of the invention are not limited to elements of embodiments and modified examples of the invention described with reference to the drawings. The other objects, features and accompanied advantages of the invention can be easily understood from the embodiments and the modified examples of the invention.

BRIEF DESCRIPTION OF THE DRAWINGS

FIG. 4 is a view which shows a table which describes a calculation method of calculating a reliability value Rd.

DESCRIPTION OF THE EMBODIMENTS

<Configuration of Vehicle Control Apparatus>

Figure 1:
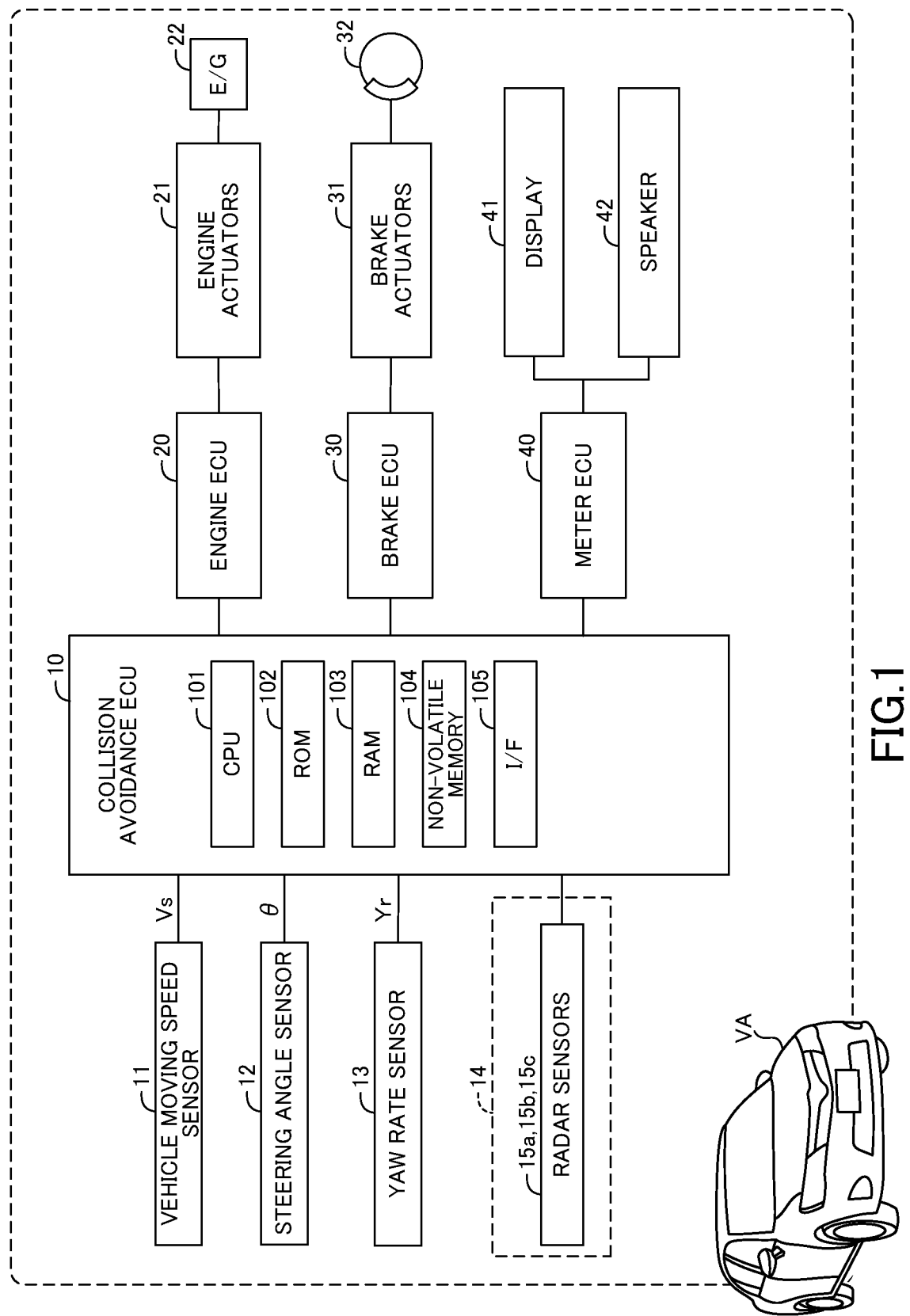
FIG. 1 is a general configuration view which shows a vehicle control apparatus according to one or more embodiments of the invention.

As shown in FIG. 1, a vehicle control apparatus according to one or more embodiments of the invention is applied to an own vehicle VA. The vehicle control apparatus includes a collision avoidance ECU 10, an engine ECU 20, a brake ECU 30, and a meter ECU 40. Some or all of the ECUs 10, 20, 30, and 40 may be integrated into one ECU. Hereinafter, the collision avoidance ECU 10 will be simply referred to as "ECU 10".

Each of the ECUs 10, 20, 30, and 40 is an electronic control unit which includes a micro-computer as a main component. The ECUs 10, 20, 30, and 40 are electrically connected via a CAN (Controller Area Network) not shown so as to send and receive information to and from each other.

The micro-computer includes a CPU, a ROM, a RAM, a non-volatile memory, and an interface I/F. For example, the ECU 10 includes a micro-computer which includes a CPU 101, a ROM 102, a RAM 103, a non-volatile memory 104, and an interface (I/F) 105. The CPU 101 is configured to realize various functions described later by executing instructions, programs, or routines stored in the ROM 102.

The ECU 10 is electrically connected to sensors described below. The ECU 10 is configured to receive detection signals or output signals output from the sensors.

A vehicle moving speed sensor 11 detects a speed or a moving speed of the own vehicle VA. The vehicle moving speed sensor 11 outputs a signal which represents the detected moving speed Vs. A steering angle sensor 12 detects a steering angle of the own vehicle VA. The steering angle sensor 12 outputs a signal which represents the detected steering angle θ[deg]. A yaw rate sensor 13 detects a yaw rate Yr of the own vehicle VA. The yaw rate sensor 13 outputs a signal which represents the detected yaw rate Yr.

It should be noted that the steering angle θ and the yaw rate Yr are zero, respectively when the own vehicle VA moves straight. The steering angle θ and the yaw rate Yr take positive values, respectively when the own vehicle VA turns left. On the other hand, the steering angle θ and the yaw rate Yr take negative values, respectively when the own vehicle VA turns right.

Hereinafter, information on moving states of the own vehicle VA output from the sensors 11 to 13 will be also referred to as "moving state information". It should be noted that the own vehicle VA may include sensors which acquires other moving state information such as an acceleration value of the own vehicle VA.

Surrounding sensors 14 acquire information on standing objects in a surrounding area around the own vehicle VA. In this embodiment, as described later, the surrounding area includes a forward area, a right side area, and a left side area. The standing objects include, for example, moving objects such as four-wheel vehicles, pedestrians, and bicycles and non-moving objects such as electric poles, trees, and guard rails. Hereinafter, the standing object will be simply referred to as "object". The surrounding sensors 14 are configured to calculate and output information on the objects. Hereinafter, the information on the objects will be referred to as "object information".

Figure 2:
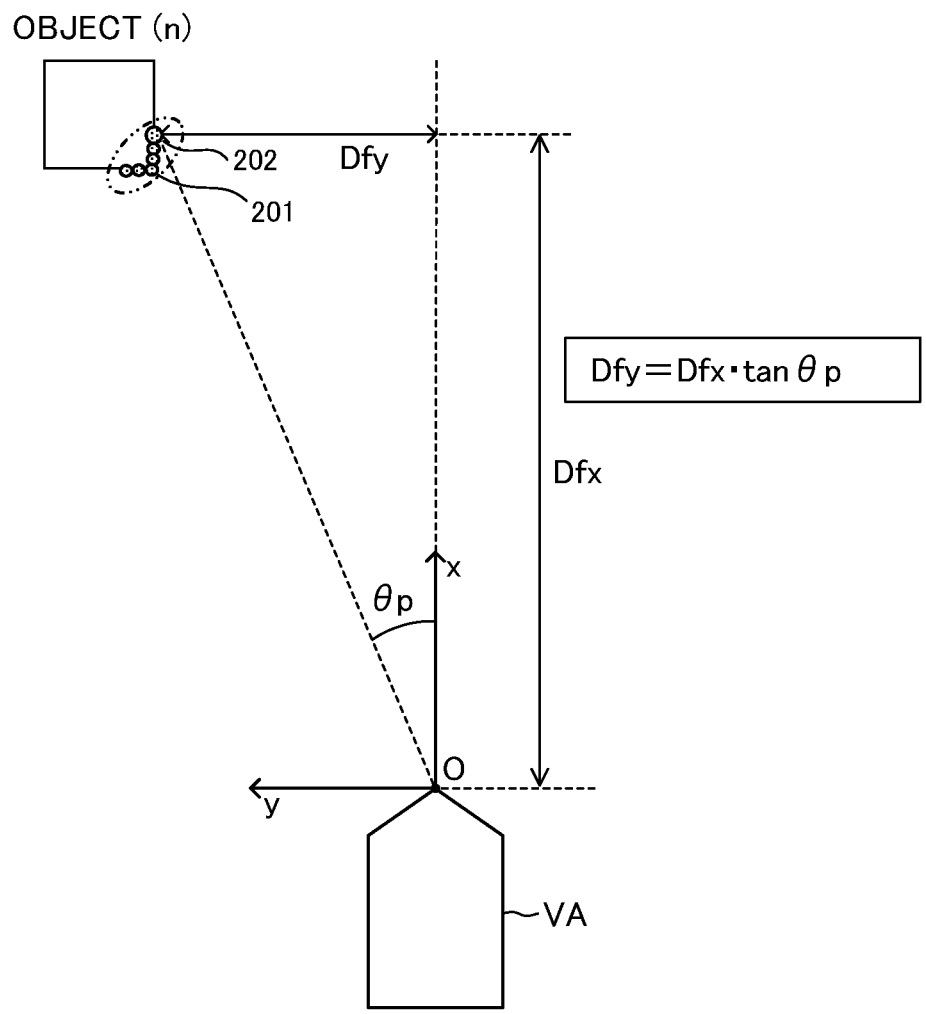
FIG. 2 is a view which describes object information acquired by surrounding sensors.

As shown in FIG. 2, the surrounding sensors 14 acquire the object information by using a two dimension coordinate system. The two dimension coordinate system is defined by an x-axis and a y-axis. An origin of the x-axis and the y-axis is a center position O of a front portion of the own vehicle VA. The center position is a center in a vehicle width direction of the own vehicle VA. The x-axis extends in a longitudinal direction of the own vehicle VA through the center position O of the own vehicle VA. The x-axis is a coordinate axis which has positive values corresponding to positions forward from the own vehicle VA. The y-axis extends perpendicular to the x-axis. The y-axis is a coordinate axis which has positive values corresponding to position left from the own vehicle VA.

The object information on the object (n) includes a longitudinal distance Dfx(n) of the object (n), a lateral position Dfy(n) of the object (n), a relative speed Vfx(n), an orientation θp((n) of the object (n), a moving direction of the object (n), and a type of the object (n).

The longitudinal distance Dfx(n) is a distance in an x-axis direction between the object (n) and the origin O. The longitudinal distance Dfx(n) takes a positive value or a negative value. The lateral position Dfy(n) is a distance in a y-axis direction between the object (n) and the origin O. The lateral position Dfy(n) takes a positive value or a negative value. The relative speed Vfx(n) is a speed of the object (n) with respect to the own vehicle VA in the x-axis direction. That is, the relative speed Vfx(n) is a difference between a moving speed Vn of the object (n) and the moving speed Vs of the own vehicle VA in the x-axis direction (Vfx(n)=Vn−Vs). The orientation θp(n) is an angle defined by the x-axis and a line which connects the origin O and the object (n). The moving direction of the object (n) is a relative moving direction of the object (n) with respect to the own vehicle VA.

The type of the object (n) includes information on which the object is, the moving object or the non-moving object. In this embodiment, when the object is the moving object, the type of the object (n) includes information on which the object (n) is, a vehicle or an object other than the vehicle. In this embodiment, the vehicle as the type of the object (n) is a four-wheel vehicle. Hereinafter, the object other than the vehicle will be referred to as "particular object". The particular object is an object which is deemed to have a moving speed lower than a moving speed of the four wheel vehicle.

Again, referring to FIG. 1, the surrounding sensors 14 include radar sensors 15a, 15b, and 15c.

Figure 3:
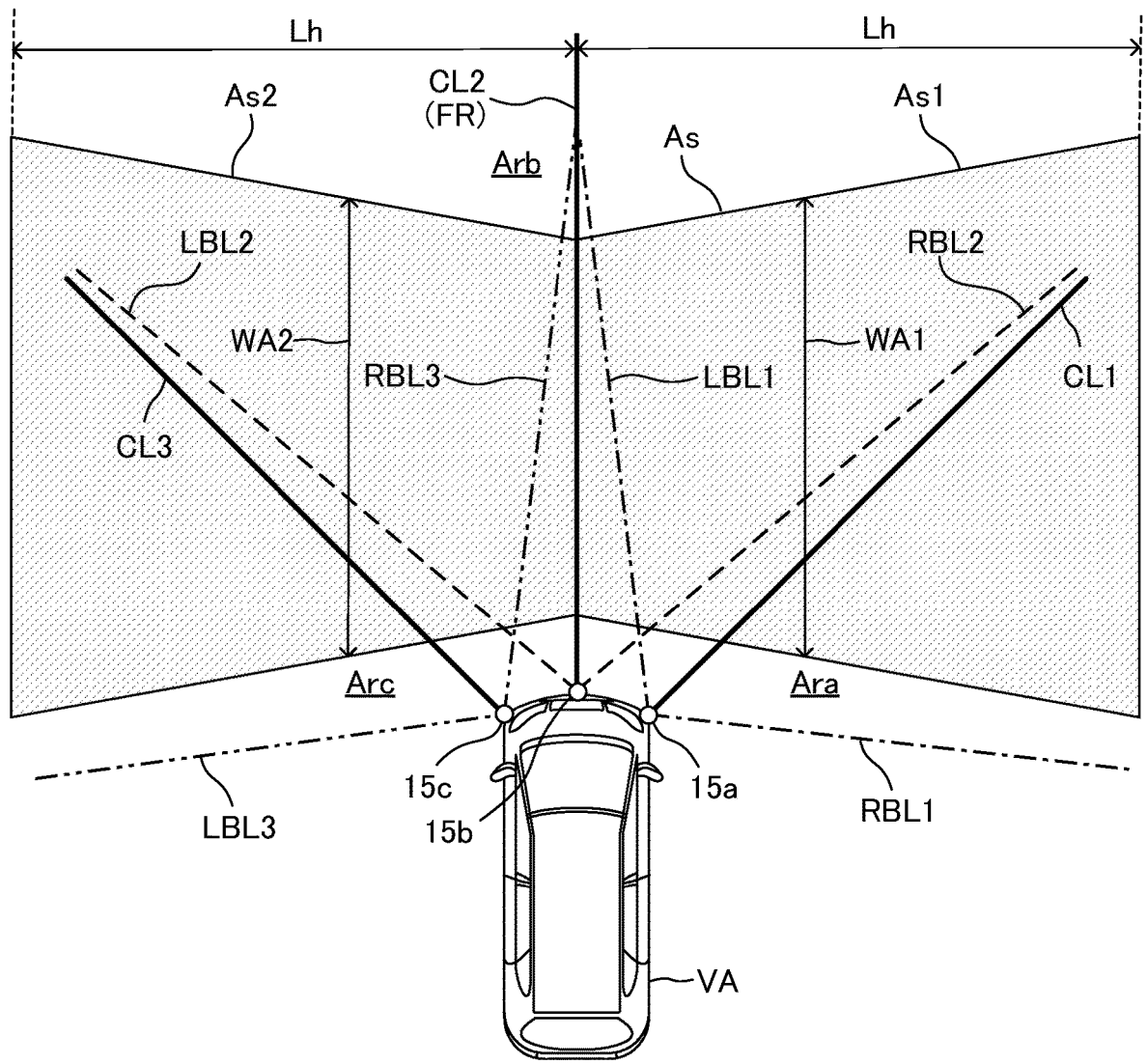
FIG. 3 is a view which shows detection areas of radar sensors.

As shown in FIG. 3, the radar sensor 15a is mounted on a right end of a front end portion of the own vehicle VA. The radar sensor 15b is mounted on a center of the front end portion of the own vehicle VA. The radar sensor 15c is mounted on a left end of the front end portion of the own vehicle VA. It should be noted that when the radar sensors 15a, 15b, and 15c do not need to be distinguished from each other, each of the radar sensors 15a, 15b, and 15c will be referred to as "radar sensor 15".

The radar sensor 15 transmits electromagnetic waves such as radio waves of a millimeter wave band and detects objects by using reflection point information on reflection points by which the electromagnetic waves are reflected. Hereinafter, the radio waves of the millimeter wave band will be referred to as "millimeter wavers". The radar sensor 15 includes a radar wave transmitting/receiving section and an information processing section. The radar wave transmitting/receiving section transmits the millimeter waves and receives reflected waves, i.e., the millimeter waves reflected by the objects in a transmission area. It should be noted that the radar sensor 15 may be a radar sensor which uses radio waves of frequency band other than the millimeter wave band.

The information processing section detects the objects, based on the reflection point information. The reflection point information includes (i) a phase difference between the transmitted millimeter wave and the received reflected wave, (ii) an attenuation level of the reflected wave, and (iii) a time taken for the radar wave transmitting/receiving section to receive the reflected wave from transmitting the millimeter wave. As shown in FIG. 2, the information processing section groups the reflection points which are close to each other. Alternatively, the information processing section groups the reflection points which are close to each other and move in the same direction. Then, the information processing section detects a group of the grouped reflection points as a single object (n). Hereinafter, the group of the grouped reflection points will be referred to as "reflection point group 201". The information processing section acquires or calculates the object information on the object (n), based on the reflection point information. The information processing section calculates the object information on the object (n) by using an optional reflection point 202 of the reflection point group 201. Hereinafter, the optional reflection point of the reflection point group 201 will be referred to as "representative reflection point 202".

In this embodiment, the representative reflection point 202 is the reflection point which is included in the reflection point group 201 and has the greatest reflection strength. The representative reflection point 202 is not limited to the reflection point which is included in the reflection point group 201 and has the greatest reflection strength. The representative reflection point 202 may be a left end reflection point of the reflection point group 201, or a right end reflection point of the reflection point group 201, or an intermediate reflection point of the reflection point group 201 between the left end reflection point and the right end reflection point.

The information processing section determines which the object (n) is, the moving object or the non-moving object, based on a change of a position of the object (n) with respect to the own vehicle VA. When the object (n) is the moving object, the information processing section determines which the object (n) is, the vehicle (the four-wheel vehicle) or the particular object (the pedestrian), based on the reflection strength of the representative reflection point 202. In particular, when the reflection strength of the representative reflection point 202 is greater than a predetermined strength threshold Sth, the information processing section determines the object (n) as a vehicle. On the other hand, when the reflection strength of the representative reflection point 202 is equal to or smaller than the predetermined strength threshold Sth, the information processing section determines the object (n) as a particular object.

As shown in FIG. 3, the radar sensor 15a has an area Ara of detecting the objects around a detection axis CL1. The detection axis CL1 extends right forward from the right end of the front end portion of the own vehicle VA. The area Ara of the radar sensor 15a is a sectoral area which has a radius of a predetermined distance and is defined by a right boundary line RBL1 and a left boundary line LBL1. The right boundary line RBL1 is a line which is rotated clockwise about the right end of the front end portion of the own vehicle VA from the detection axis CL1. The left boundary line LBL1 is a line which is rotated counterclockwise about the right end of the front end portion of the own vehicle VA from the detection axis CL1. The radar sensor 15a detects the objects in the area Ara or the right side area of the own vehicle VA and acquires or calculates the object information on the detected objects.

The radar sensor 15b has an area Arb of detecting the objects around a detection axis CL2. The detection axis CL2 extends forward from the center portion of the front end portion of the own vehicle VA. The center portion is a center in the width direction of the own vehicle VA. The area Arb of the radar sensor 15b is a sectoral area which has a radius of the predetermined distance and is defined by a right boundary line RBL2 and a left boundary line LBL2. The right boundary line RBL2 is a line which is rotated clockwise about the center portion of the front end portion of the own vehicle VA from the detection axis CL2. The left boundary line LBL2 is a line which is rotated counterclockwise about the center portion of the front end portion of the own vehicle VA from the detection axis CL2. The detection axis CL2 corresponds to a vehicle longitudinal axis FR of the own vehicle VA. The radar sensor 15b detects the objects in the area Arb or the forward area of the own vehicle VA and acquires or calculates the object information on the detected objects.

Similarly, the radar sensor 15c has an area Arc of detecting the objects around a detection axis CL3. The detection axis CL3 extends left forward from the left end of the front end portion of the own vehicle VA. The area Arc of the radar sensor 15c is a sectoral area which has a radius of the predetermined distance and is defined by a right boundary line RBL3 and a left boundary line LBL3. The right boundary line RBL3 is a line which is rotated clockwise about the left end of the front end portion of the own vehicle VA from the detection axis CL3. The left boundary line LBL3 is a line which is rotated counterclockwise about the left end of the front end portion of the own vehicle VA from the detection axis CL3. The radar sensor 15c detects the objects in the area Arc or the left side area of the own vehicle VA and acquires or calculates the object information on the detected objects.

An area defined by the areas Ara, Arb, and Arc will be also referred to as "detection area". The ECU 10 acquires the object information on the object (n) in the detection area from the radar sensors 15a to 15c each time a predetermined time dt elapses.

Again, referring to FIG. 1, the engine ECU 20 is electrically connected to engine actuators 21. The engine actuators 21 include a throttle valve actuator which changes an opening degree of a throttle valve of a spark-ignition gasoline-fuel-injection type of an internal combustion engine 22. The engine ECU 20 can change a torque which the internal combustion engine 22 generates by driving the engine actuators 21. The torque which the internal combustion engine 22 generates, is transmitted to driven wheels (not shown) of the own vehicle VA via a transmission (not shown). Thus, the engine ECU 20 can control a driving force and change an accelerated state or an acceleration of the own vehicle VA by controlling the engine actuators 21.

It should be noted that when the own vehicle VA is a hybrid vehicle, the engine ECU 20 can control the driving force generated by one or both of the internal combustion engine and at least one electric motor as vehicle driving sources. Alternatively, when the own vehicle VA is an electric vehicle, the engine ECU 20 can control the driving force generated by at least one electric motor as the vehicle driving source.

The brake ECU 30 is electrically connected to brake actuators 31. The brake actuators 31 include hydraulic circuits. The hydraulic circuits include a master cylinder, flow passages through which braking oil flows, valves, at least one pump, and at least one electric motor of driving the at least one pump. The brake ECU 30 adjusts hydraulic pressure supplied to wheel cylinders installed in brake mechanisms 32 by controlling the brake actuators 31. With the hydraulic pressure, the wheel cylinders generate friction braking forces on wheels of the own vehicle VA. Thus, the brake ECU 30 can control a braking force and change the accelerated state or a deceleration or a negative acceleration of the own vehicle VA by controlling the brake actuators 31.

The meter ECU 40 is electrically connected to a display 41 and a speaker 42. The display 41 is a multi-information display which is provided in front of a driver's seat of the own vehicle VA. It should be noted that the display 41 may be a head-up display. The meter ECU 40 displays an alerting mark such as a warning lamp on the display 41 in response to a command from the ECU 10. In addition, the meter ECU 40 outputs an alerting sound for alerting a driver of the own vehicle VA from the speaker 42 in response to a command from the ECU 10.

<Extrapolation Process>

The ECU 10 detects or recognizes the object (n), based on the object information. The ECU 10 executes an extrapolation process with regard to the detected object (n). The extrapolation process is a process of predicting the object information on the object (n) which is detected at a certain point of time and then is temporarily not detected. The extrapolation process is known (for example, see JP 2015-137915 A and JP 2019-2689 A). The ECU 10 can seamlessly detect the object (n) by the extrapolation process.

<Reliability Value>

In addition, the ECU 10 calculates a reliability value Rd of the object (n). The reliability value Rd represents an actual existence probability of the object (n). The actual existence probability of the object (n) is a probability that the object (n) actually exists. As the reliability value Rd increases, the actual existence probability of the object (n) increases. The reliability value Rd takes a value, for example, from "0" to "100". That is, the minimum value of the reliability value Rd is "0", and the maximum value of the reliability value Rd is "100". In this embodiment, the ECU 10 calculates the reliability value Rd as described below.

The ECU 10 acquires the object information from the radar sensors 15a to 15c each time the predetermined time dt elapses. The ECU 10 detects the object (n), based on the object information. Hereinafter, a point of time when the ECU 10 first detects the object (n) will be referred to as "detection start point of time".

As shown in FIG. 4, the ECU 10 sets the reliability value Rd of the object (n) to an initial value Rd_ini (for example, "30") at the detection start point of time. At a point of time when the predetermined time dt elapses since the detection start point of time, the ECU 10 acquires the object information from the radar sensors 15a to 15c, again. When the object (n) is detected at this point of time, the ECU 10 increases the reliability value Rd of the object (n) by a predetermined value Rd0 (>0). That is, as far as the object (n) is detected, the ECU 10 increases the reliability value Rd of the object (n) by the predetermined value Rd0 each time the predetermined time dt elapses.

When the once-detected object (n) is not detected, the ECU 10 executes the extrapolation process as described above to predict the object information on the object (n). The ECU 10 executes the extrapolation process each time the predetermined time dt elapses as far as the object (n) is not detected. While the ECU 10 executes the extrapolation process, the ECU 10 measures a duration time Ti of executing the extrapolation process. The duration time Ti represents a duration time for which the object (n) has not been detected. As the duration time Ti increases, the actual existence probability of the object (n) decreases. Accordingly, the ECU 10 decreases the reliability value Rd as the duration time Ti increases.

In particular, at a point of time when the once-detected object (n) is not detected, the ECU 10 starts measuring the duration time Ti of executing the extrapolation process with regard to the object (n) in question. Thereafter, at a point of time when the object (n) is detected again, the ECU 10 terminates measuring the duration time Ti of executing the extrapolation process with regard to the object (n) in question.

As shown in FIG. 4, when the duration time Ti is equal to or shorter than a first time Ta, the ECU 10 decreases the reliability value Rd of the object (n) by a first value Rd1. The first time Ta is equal to or longer than the predetermined time dt.

When the duration time Ti is longer than the first time Ta and equal to or shorter than a second time Tb, the ECU 10 decreases the reliability value Rd of the object (n) by a second value Rd2. The second time Tb is longer than the first time Ta. The second value Rd2 is greater than the first value Rd1. Thus, as the duration time Ti increases, an amount of decreasing the reliability value Rd increases.

It should be noted that at a point of time when the duration time Ti becomes longer than the second time Tb, the ECU 10 sets the reliability value Rd of the object (n) to "0". That is, the ECU 10 determines that the object (n) does not actually exist. Thus, the ECU 10 deletes the object information on the object (n). It should be noted that a method of calculating the reliability value Rd is not limited to one described above. The reliability value Rd may be calculated by other methods.

<Processing on Two Dimension Coordinate System>

The ECU 10 executes processes on a two dimension coordinate system as described below to execute a collision avoidance control described later.

Figure 5:
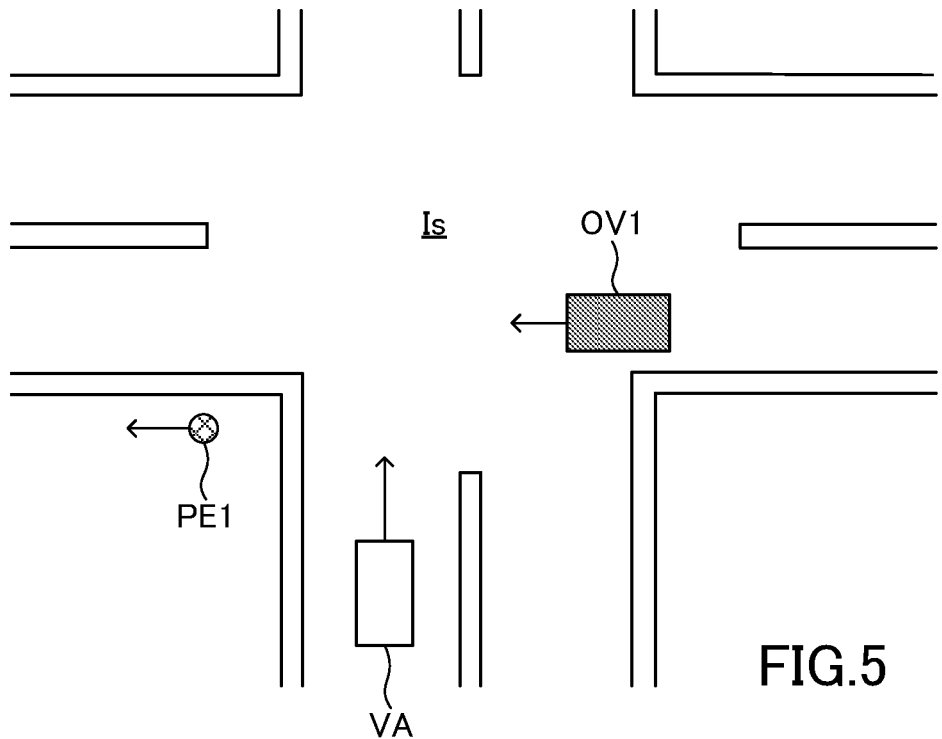
FIG. 5 is a view which shows a situation that an own vehicle is moving into a traffic intersection.

In an example shown in FIG. 5, the own vehicle VA is moving into a traffic intersection Is. There are a first other vehicle OV1 and a first pedestrian PE1 ahead of the own vehicle VA. The first other vehicle OV1 moves in the traffic intersection Is. The first pedestrian PE1 is moving away from the own vehicle VA.

Figure 6:
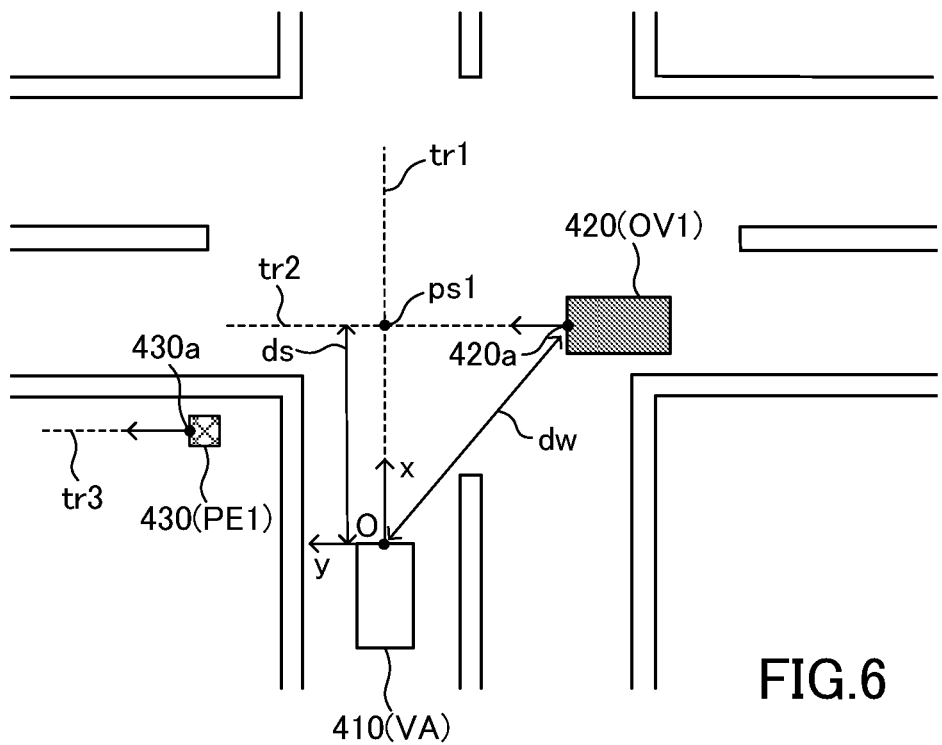
FIG. 6 is a view which describes processing on a two dimension coordinate system in the situation shown in FIG. 5.

In this example, as shown in FIG. 6, the ECU 10 simplifies and draws the own vehicle VA, the first other vehicle OV1, and the first pedestrian PE1 on the two dimension coordinate system. In particular, the ECU 10 draws a first rectangle 410 on the two dimension coordinate system. The first rectangle 410 represents a body of the own vehicle VA. The ROM 102 has stores Information on a size of the body of the own vehicle VA. The ECU 10 sets a size of the first rectangle 410, based on the information on the size of the body of the own vehicle VA stored in the ROM 102. In addition, the ECU 10 draws a second rectangle 420. The second rectangle 420 represents a body of the first other vehicle OV1. It should be noted that a size of the second rectangle 420 may be set, based on a size of a body of a general vehicle. In addition, the ECU 10 draws a third rectangle 430. The third rectangle 430 represents the first pedestrian PE1. It should be noted that a size of the third rectangle 430 may be set, based on a size of a general human.

The ECU 10 draws a first predicted moving route tr1 on the two dimension coordinate system, based on the moving state information. The first predicted moving route tr1 is a route of a center position O of the own vehicle VA which moves from the current point of time or a first point of time to a second point of time, assuming that the own vehicle VA moves, maintaining the current moving states such as the moving speed Vs and the yaw rate Yr of the own vehicle VA.

The second point of time is a point of time when a predetermined time t1 elapses since the current point of time.

The ECU 10 calculates a moving direction of the first other vehicle OV1 and a moving speed Vo1 of the first other vehicle OV1, based on the object information. Then, the ECU 10 draws a second predicted moving route tr2 on the two dimension coordinate system, based on the moving direction and the moving speed Vo1 of the first other vehicle OV1. The second predicted moving route tr2 is a route of a particular position 420*a* of the first other vehicle OV1 which moves from the current point of time or the first point of time to the second point of time, assuming that the first other vehicle OV1 moves, maintaining the current moving states such as the moving direction and the moving speed Vo1 of the first other vehicle OV1. In this example, the particular position 420*a* of the first other vehicle OV1 is a center position of a front portion of the first other vehicle OV1. The center position is a center in a width direction of the first other vehicle OV1.

The ECU 10 calculates a moving direction of the first pedestrian PE1 and a moving speed Vo1 of the first pedestrian PE1, based on the object information. Then, the ECU 10 draws a third predicted moving route tr3 on the two dimension coordinate system, based on the moving direction and the moving speed Vo1 of the first pedestrian PE1. The third predicted moving route tr3 is a route of a particular position 430*a* of the first pedestrian PE1 which moves from the current point of time or the first point of time to the second point of time, assuming that the first pedestrian PE1 moves, maintaining the current moving states such as the moving direction and the moving speed Vo1 of the first pedestrian PE1.

As described above, the ECU 10 can calculate the route (the first predicted moving route tr1) of the own vehicle VA and the routes (the second predicted moving route tr2 and the third predicted moving route tr3) of the objects (the first other vehicle OV1 and the first pedestrian PE1) in the detection area on the two dimension coordinate system.

<Collision Avoidance Control>

The ECU 10 is configured to execute the known collision avoidance control when the ECU 10 determines that a predetermined execution condition becomes satisfied, based on a method described later. The collision avoidance control of this embodiment is a control for avoiding a collision of the own vehicle VA with the object which approaches the own vehicle VA from the right or left side area of the own vehicle VA.

In particular, the ECU 10 selects the objects in a selection area As shown in FIG. 3 from the objects included in the object information. Hereinafter, the objects selected this way will be referred to as "first object group OB1". In this embodiment, the objects selected as the first object group OB1 are the moving objects. The ECU 10 can select the moving objects as the first object group OB1, based on the types of the objects included in the object information.

The selection area As is set such that (i) the objects moving toward the own vehicle VA from the right side area of the own vehicle VA and (ii) the objects moving toward the own vehicle VA from the left side area of the own vehicle VA can be selected or picked up. In particular, the selection area As includes a first area As1 and a second area As2. The first area As1 is an area which extends rightward from the vehicle longitudinal axis FR of the own vehicle VA, has a length Lh in the right direction from the vehicle longitudinal axis FR of the own vehicle VA and is used to select the objects moving toward the own vehicle VA from the right side area of the own vehicle VA. A width WA1 of the first area As1 in the longitudinal direction of the own vehicle VA is set such that the width WA1 increases with distance rightward from the vehicle longitudinal axis FR. The second area As2 is an area which extends leftward from the vehicle longitudinal axis FR of the own vehicle VA, has a length Lh in the left direction from the vehicle longitudinal axis FR of the own vehicle VA and is used to select the objects moving toward the own vehicle VA from the left side area of the own vehicle VA. A width WA2 of the second area As2 in the longitudinal direction of the own vehicle VA is set such that the width WA2 increases with distance leftward from the vehicle longitudinal axis FR.

Next, the ECU 10 selects a predetermined upper limit number Nx or less of the objects from the first object group OB1. Hereinafter, the object selected this way will be referred to as "second object group OB2". Details of selecting the second object group OB2 will be described later.

Load of a calculation process described below of determining a collision probability that the own vehicle VA collides with the object is great. Thus, if the calculation process is executed with regard to all of the objects included in the first object group OB1, it may be difficult to complete the calculation process in a limited time. The predetermined upper limit number Nx is an upper limit value of the number of the objects and is prepared to reduce the processing load of the ECU 10. The predetermined upper limit number Nx is set to two or more in consideration of the processing load of the ECU 10. Thus, the number of the objects included in the second object group OB2 is limited to the predetermined upper limit number Nx in consideration of the processing load of the ECU 10. Thereby, the ECU 10 can complete the calculation process in a limited time.

The ECU 10 determines whether the second object group OB2 includes any objects which probably collide with the own vehicle VA. Hereinafter, the objects which probably collide with the own vehicle VA will be referred to as "target objects".

In the example shown in FIG. 5, when the ECU 10 selects the first other vehicle OV1 and the first pedestrian PE1 as the second object group OB2, the ECU 10 determines whether the second object group OB2 includes the target objects, using information on the two dimension coordinate system. In particular, the ECU 10 determines whether there is a route which crosses the first predicted moving route tr1. In an example shown in FIG. 6, the first predicted moving route tr1 crosses the first predicted moving route tr1. Thus, the first other vehicle OV1 corresponding to the second predicted moving route tr2 is the object which probably collides with the own vehicle VA. Thus, the ECU 10 selects the first other vehicle OV1 as the target object. On the other hand, the first predicted moving route tr1 does not cross the third predicted moving route tr3. Thus, the ECU 10 does not select the first pedestrian PE1 as the target object.

Next, the ECU 10 determines whether the predetermined execution condition is satisfied with regard to the target object. The predetermined execution condition is a condition for determining whether to execute or start executing the collision avoidance control.

The predetermined execution condition is a condition relating to an index value which represents the collision probability that the own vehicle VA collides with the control target object. In this embodiment, the index value is a time Tc required for the own vehicle VA to reach a moving path (the second predicted moving route tr2) of the control target object (the first other vehicle OV1). It should be noted that the time Tc may be a margin time until the own vehicle VA collides with the first other vehicle OV1.

In particular, as shown in FIG. 6, the ECU 10 acquires a crossing position ps1 at which the first predicted moving route tr1 crosses the second predicted moving route tr2. Then, the ECU 10 acquires the time Tc required for the center position O of the own vehicle VA to reach the crossing position ps1, based on the moving state information such as the moving speed Vs and the yaw rate Yr of the own vehicle VA. For example, the ECU 10 can acquire the time Tc by dividing a distance ds between the own vehicle VA and the crossing position ps1 by the moving speed Vs of the own vehicle VA.

When the time Tc becomes equal to or shorter than a predetermined time threshold Tcth, the ECU 10 determines that the predetermined execution condition becomes satisfied and executes the collision avoidance control.

It should be noted that when there are the control target objects, the ECU 10 determines whether the predetermined execution condition is satisfied with regard to each of the control target objects.

The collision avoidance control includes a driving force limitation control of limiting a driving force applied to the own vehicle VA, a braking force control of applying a braking force to wheels of the own vehicle VA, and an alerting control of alerting the driver of the own vehicle VA. In particular, the ECU 10 sends a driving command signal to the engine ECU 20. When the engine ECU 20 receives the driving command signal from the ECU 10, the engine ECU 20 controls the engine actuators 21 to limit the driving force such that an actual acceleration of the own vehicle VA corresponds to a target acceleration AG (for example, zero) included in the driving command signal. In addition, the ECU 10 sends a braking command signal to the brake ECU 30. When the brake ECU 30 receives the braking command signal from the ECU 10, the brake ECU 30 controls the brake actuators 31 to apply the braking force to the wheels of the own vehicle VA such that an actual deceleration of the own vehicle VA corresponds to a target deceleration TG included in the braking command signal. In addition, the ECU 10 sends an alerting command signal to the meter ECU 40. When the meter ECU 40 receives the alerting command signal from the ECU 10, the meter ECU 40 displays the alerting mark on the display 41 and outputs the alerting sound from the speaker 42.

<Selection of Second Object Group>

Next, a method of selecting the second object group OB2 will be described. The ECU 10 selects the second object group OB2 from the objects included in the first object group OB1 in accordance with a method described below.

Below, a method of selecting the second object group OB2 in a situation A and a situation B described below, will be described. Hereinafter, the number of the objects included in the first object group OB1 will be referred to as "first number Na".

Situation A: The first number Na is equal to or smaller than the predetermined upper limit number Nx (i.e., Na≤Nx).

Situation B: The first number Na is greater than the predetermined upper limit number Nx (i.e., Na>Nx).

In the situation A, the ECU 10 selects all of the objects included in the first object group OB1 as the second object group OB2.

In the situation B, the ECU 10 selects the objects each having the reliability value equal to or greater than a predetermined reliability threshold Rth from the first object group OB1. The objects selected this way will be referred to as "third object group OB3". In addition, the number of the objects included in the third object group OB3 will be referred to as "second number Nb". The third object group OB3 is an object group which includes the objects each having the high actual existence possibility.

Next, the ECU 10 selects the objects each having the reliability value smaller than the predetermined reliability threshold Rth from the first object group OB1. The objects selected this way will be referred to as "fourth object group OB4". In other words, the ECU 10 select, as the fourth object group OB4, the objects which are not selected as the third object group OB3 from the first object group OB1. The fourth object group OB4 is an object group which includes the objects each having the actual existence probability lower than the actual existence probability of the object of the third object group OB3.

Then, any one of a situation B-1 to a situation B-3 described below may occur.

Situation B-1: The second number Nb is equal to the predetermined upper limit number Nx (i.e., Nb=Nx).

Situation B-2: The second number Nb is greater than the predetermined upper limit number Nx (i.e., Nb>Nx).

Situation B-3: The second number Nb is smaller than the predetermined upper limit number Nx (i.e., Nb<Nx).

Below, a method of selecting the second object group OB2 in each of the situation B-1 to the situation B-3 will be described.

<Situation B-1>

The ECU 10 selects all of the objects included in the third object group OB3 as the second object group OB2.

<Situation B-2>

The ECU 10 calculates a priority value P of each of the objects included in the third object group OB3. The priority value P represents a collision probability of the object. The collision probability of the object is a probability that the object collides with the own vehicle VA. As the priority value P increases, the collision probability of the object increases. In this embodiment, the priority value P is acquired, based on a distance between the own vehicle VA and the predicted moving route of the object on the two dimension coordinate system.

In the example shown in FIG. 6, the ECU 10 acquires the priority value P of the first other vehicle OV1 as described below. The ECU 10 calculates a distance ds between the center position O of the own vehicle VA and the crossing position ps1. The ECU 10 acquires the priority value P by applying the distance ds to a predetermined first priority map Map1(ds). The predetermined first priority map Map1(ds) defines a relationship between the distance ds and the priority value P. As the distance ds decreases, the priority value P increases. In other words, as the own vehicle VA approaches the predicted moving route of the object (in the example shown in FIG. 6, the second predicted moving route tr2), the priority value P of the object in question increases.

It should be noted that in the example shown in FIG. 6, the third predicted moving route tr3 of the first pedestrian PE1 does not cross the first predicted moving route tr1 of the own vehicle VA. In this case, the ECU 10 sets the priority value P of the first pedestrian PE1 to a predetermined minimum value. Thereby, the ECU 10 can reduce a probability that the first pedestrian PE1 is selected as the second object group OB2. That is, the ECU 10 can reduce a probability that the object having the low probability of colliding with the own vehicle VA is selected as the second object group OB2.

Next, the ECU 10 determines whether the moving speed Vs of the own vehicle VA is equal to or lower than a predetermined moving speed threshold Vth. The predetermined moving speed threshold Vth is a threshold used to determine whether the own vehicle VA moves at a low speed. When the moving speed Vs is equal to or lower than the predetermined moving speed threshold Vth, the ECU 10 decreases the priority value P of the particular object included in the third object group OB3 by a predetermined value Pd (>0). As described above, the particular object is an object or a pedestrian which moves at a speed lower than a moving speed of the four-wheel vehicle. When the own vehicle VA moves at the low speed, the probability of the own vehicle VA colliding with the particular object is low. Accordingly, the ECU 10 decreases the priority value P of the particular object. Thereby, the ECU 10 can reduce a probability that the particular object is selected as the second object group OB2.

It should be noted that when the moving speed Vs of the own vehicle VA is higher than the predetermined moving speed threshold Vth, the ECU 10 does not change the priority value P of the particular object.

The ECU 10 selects the predetermined upper limit number Nx of the objects from the third object group OB3 as the second object group OB2 in descending order of the priority value P.

Operation Example 1

Figure 7:
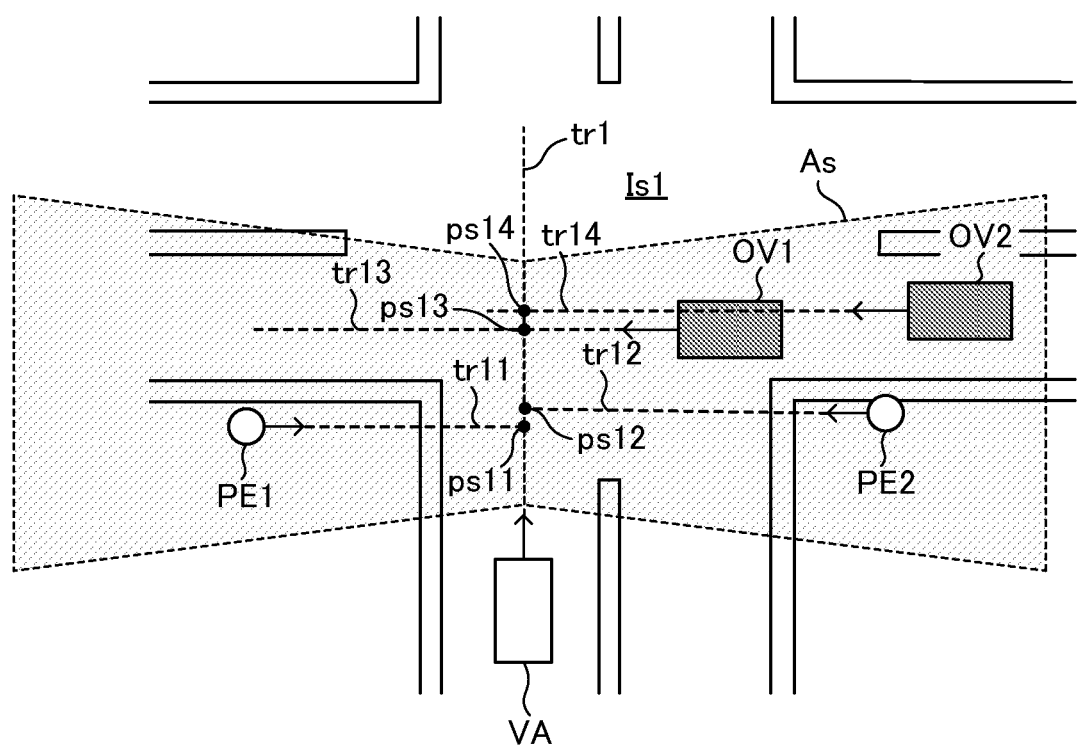
FIG. 7 is a view which shows a situation that the vehicle is moving into the traffic intersection.

An operation example 1 of the ECU 10 in the situation B-2 will be described with reference to FIG. 7. In this example, for simplifying the description, the predetermined upper limit number Nx is "2".

The own vehicle VA moves at the low speed toward the traffic intersection Is1. That is, the moving speed Vs of the own vehicle VA is equal to or lower than the predetermined moving speed threshold Vth. Further, there are the first other vehicle OV1, the second other vehicle OV2, the first pedestrian PE1, and the second pedestrian PE2 ahead of the own vehicle VA.

The ECU 10 detects the first other vehicle OV1, the second other vehicle OV2, the first pedestrian PE1, and the second pedestrian PE2, based on the object information. Then, the ECU 10 detects the first pedestrian PE1 and the second pedestrian PE2 as the particular objects.

The above-mentioned four objects OV1, OV2, PE1, and PE2 are in the selection area As. Thus, the ECU 10 selects the four objects OV1, OV2, PE1, and PE2 as the first object group OB1. The reliability values Rd of the four objects OV1, OV2, PE1, and PE2 are all equal to or greater than the predetermined reliability threshold Rth. Thus, the ECU 10 selects, as the third object group OB3, the four objects OV1, OV2, PE1, and PE2.

In this case, the second number Nb (=4) is greater than the predetermined upper limit number Nx (=2). Thus, the ECU 10 calculates the priority values P of the four objects OV1, OV2, PE1, and PE2. Hereinafter, the priority value P of the first other vehicle OV1 will be referred to as "priority value Pov1", the priority value P of the second other vehicle OV2 will be referred to as "priority value Pov2", the priority value P of the first pedestrian PE1 will be referred to as "priority value Ppe1", and the priority value P of the second pedestrian PE2 will be referred to as "priority value Ppe2".

The predicted moving routes of the first pedestrian PE1, the second pedestrian PE2, the first other vehicle OV1, and the second other vehicle OV2 are moving routes tr11, tr12, tr13, and tr14, respectively. A position ps11 is the crossing position of the predicted moving route tr11 of the first pedestrian PE1 and the first predicted moving route tr1 of the own vehicle VA. A position ps12 is the crossing position of the predicted moving route tr12 of the second pedestrian PE2 and the first predicted moving route tr1 of the own vehicle VA. A position ps13 is the crossing position of the predicted moving route tr13 of the first other vehicle OV1 and the first predicted moving route tr1 of the own vehicle VA. A position ps14 is the crossing position of the predicted moving route tr14 of the second other vehicle OV2 and the first predicted moving route tr1 of the own vehicle VA. The crossing position ps11 corresponding to the first pedestrian PE1 is nearest the own vehicle VA among the four crossing positions ps11, ps12, ps13, and ps14. The crossing position ps12 corresponding to the second pedestrian PE2 is second nearest the own vehicle VA among the four crossing positions ps11, ps12, ps13, and ps14. The crossing position ps13 corresponding to the first other vehicle OV1 is third nearest the own vehicle VA among the four crossing positions ps11, ps12, ps13, and ps14. The crossing position ps14 corresponding to the second other vehicle OV2 is fourth nearest the own vehicle VA among the four crossing positions ps11, ps12, ps13, and ps14. Thus, at a point of time when the ECU 10 calculates the priority values P of the four objects OV1, OV2, PE1, and PE2, using the predetermined first priority map Map1(ds), a relationship in magnitude between the four priority values Pov1, Pov2, Ppe1, and Ppe2 is as follows.

$$Ppe1 > Ppe2 > Pov1 > Pov2$$

In this example, the moving speed Vs of the own vehicle VA is equal to or lower than the predetermined moving speed threshold Vth. Thus, the ECU 10 decreases the priority values P of the particular objects by the predetermined value Pd. That is, the ECU 10 decreases the priority value Ppe1 of the first pedestrian PE1 by the predetermined value Pd. In addition, the ECU 10 decreases the priority value Ppe2 of the second pedestrian PE2 by the predetermined value Pd. As a result, the relationship in magnitude between the four priority values Pov1, Pov2, Ppe1, and Ppe2 is as follows.

$$Pov1 > Pov2 > Ppe1 > Ppe2$$

Then, the ECU 10 selects, as the second object group OB2, the predetermined upper limit number Nx (=2) of the objects from the third object group OB3 in descending order of the priority value P. Thus, finally, the first other vehicle OV1 and the second other vehicle OV2 are selected as the second object group OB2.

When the own vehicle VA moves at the low speed, and the particular objects PE1 and PE2 moves at a speed lower than a moving speed of the four-wheel vehicle, a probability that the particular objects PE1 and PE2 collides with the own vehicle VA is low. As described above, the ECU 10 can reduce a probability that the particular objects PE1 and PE2 are selected as the second object group OB2 by decreasing the priority values Ppe1 and Ppe2 of the particular objects PE1 and PE2. Thus, even when the number of the objects included in the second object group OB2 is limited to the predetermined upper limit number Nx in consideration of the processing load of the ECU 10, the ECU 10 can select, as the second object group OB2, the objects which have the high probability of colliding with the own vehicle VA.

<Situation B-3>

In this situation, the ECU 10 selects, as the second object group OB2, all of the objects, i.e., the second number Nb of the objects included in the third object group OB3. Thus, the ECU 10 selects, as the second object group OB2, the objects of the third object group OB3 which have the high actual existence probabilities.

Next, the ECU 10 calculates the priority values P of the objects included in the fourth object group OB4 as described above. Then, the ECU 10 determines whether the moving speed Vs of the own vehicle VA is equal to or lower than the predetermined moving speed threshold Vth. When the moving speed Vs of the own vehicle VA is equal to or lower than the predetermined moving speed threshold Vth, the ECU 10 decreases the priority values P of the particular objects included in the fourth object group OB4 by the predetermined value Pd.

It should be noted that when the moving speed Vs of the own vehicle VA is higher than the predetermined moving speed threshold Vth, the ECU 10 does not change the priority values P of the particular objects included in the fourth object group OB4.

The ECU 10 selects, as the second object group OB2, the third number Nc of the objects from the fourth object group OB4 in descending order of the priority value P. The third number Nc corresponds to a difference between the predetermined upper limit number Nx and the second number Nb (Nc=Nx−Nb). Thus, the ECU 10 finally selects, as the second object group OB2, the predetermined upper limit number Nx of the objects.

Operation Example 2

An operation example 2 of the ECU 10 in the situation B-3 will be described with reference to FIG. 7. Also, in this example, the predetermined upper limit number Nx is "2".

It should be noted that the operation example 2 is different from the operation example 1 in a following point of view. In this example, the reliability value Rd of the first other vehicle OV1 is equal to or greater than the predetermined reliability threshold Rth. Thus, the ECU 10 selects the first other vehicle OV1 as the third object group OB3. On the other hand, in this example, the reliability values Rd of the objects OV2, PE1, and PE2 other than the first other vehicle OV1 are smaller than the predetermined reliability threshold Rth. Thus, the ECU 10 selects the three objects OV2, PE1, and PE2 as the fourth object group OB4.

The second number Nb (=1) is smaller than the predetermined upper limit number Nx (=2). Thus, the ECU 10 selects, as the second object group OB2, the first other vehicle OV1 included in the third object group OB3.

Then, the ECU 10 calculates the priority values P of the three objects OV2, PE1, and PE2 included in the fourth object group OB4. Thus, at a point of time when the ECU 10 calculates the priority values P of the three objects OV2, PE1, and PE2, using the predetermined first priority map Map1(ds), a relationship in magnitude between the three priority values Pov2, Ppe1, and Ppe2 is as follows.

$$Ppe1 > Ppe2 > Pov2$$

In this example, the moving speed Vs of the own vehicle VA is equal to or lower than the predetermined moving speed threshold Vth. Thus, the ECU 10 decreases the priority values P of the particular objects included in the fourth object group OB4 by the predetermined value Pd. That is, the ECU 10 decreases the priority value Ppe1 of the first pedestrian PE1 by the predetermined value Pd. In addition, the ECU 10 decreases the priority value Ppe2 of the second pedestrian PE2 by the predetermined value Pd. As a result, the relationship in magnitude between the three priority values Pov2, Ppe1, and Ppe2 is as follows.

$$Pov2 > Ppe1 > Ppe2$$

Then, the ECU 10 selects, as the second object group OB2, the third number Nc (=1) of the object from the fourth object group OB4 in descending order of the priority value P. That is, the ECU 10 selects, as the second object group OB2, the second other vehicle OV2. Thus, finally, the first other vehicle OV1 and the second other vehicle OV2 are selected as the second object group OB2.

With the vehicle control apparatus configured as described above, even when the number of the objects included in the second object group OB2 is limited to the predetermined upper limit number Nx in consideration of the processing load of the ECU 10, the ECU 10 can select, as the second object group OB2, the objects which have the high probability of colliding with the own vehicle VA.

<Operations>

The CPU 101 of the PCS ECU 10 is configured or programmed to execute routines shown in FIG. 8 to FIG. 11 each time the predetermined time dt elapses. Hereinafter, the CPU 101 will be simply referred to as "CPU".

It should be noted that the CPU acquires the moving state information from the various sensors 11 to 13, acquires the object information from the surrounding sensors 14, and stores the acquired moving state information and the acquired object information in the RAM 103.

Figure 8:
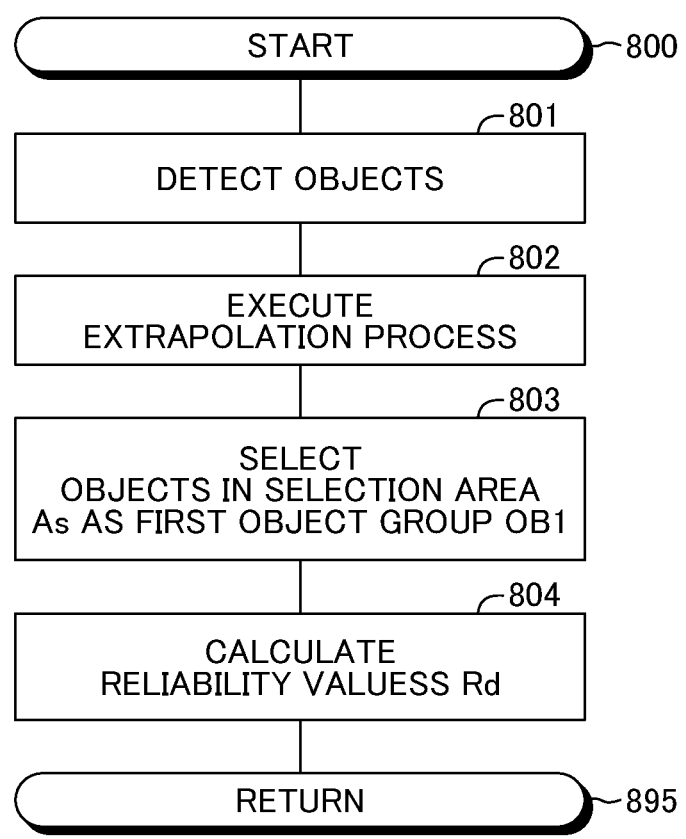
FIG. 8 is a view which shows a flowchart of an object detection routine executed by a CPU of a collision avoidance ECU.

At a predetermined timing, the CPU starts executing a process from a step 800 of the routine shown in FIG. 8 and sequentially executes processes of steps 801 to 804 described below. Then, the CPU proceeds with the process to a step 895 to terminate executing the process of this routine once.

Step 801: The CPU detects the objects in the surrounding area, based on the object information acquired from the surrounding sensors 14.

Step 802: The CPU executes the extrapolation process as described above. Thus, the CPU predicts the object information on the objects which are temporarily not detected.

Step 803: The CPU selects, as the first object group OB1, the objects in the selection area As.

Step 804: The CPU calculates the reliability values Rd of the objects included in the first object group OB1.

Figure 9:
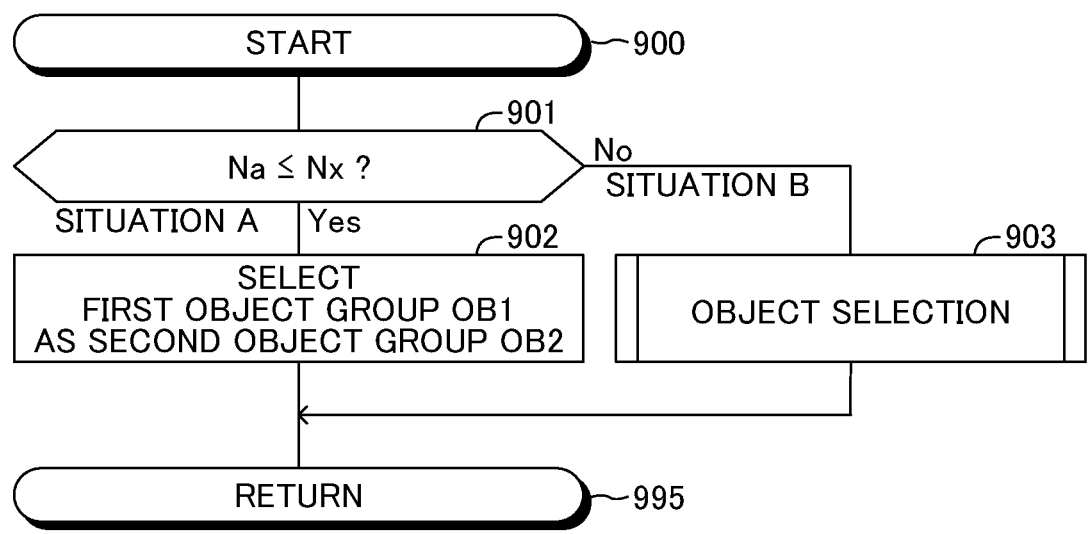
FIG. 9 is a view which shows a flowchart of a first object selection routine executed by the CPU of the collision avoidance ECU.

Further, at a predetermined timing, the CPU starts executing a process from a step 900 of the routine shown in FIG. 9 and proceeds with the process to a step 901 to determine whether the first number Na is equal to or smaller than the predetermined upper limit number Nx. When the first number Na is equal to or smaller than the predetermined upper limit number Nx, the situation corresponds to the above-described situation A. In this case, the CPU determines "Yes" at the step 901 and proceeds with the process to a step 902. At the step 902, the CPU selects, as the second object group OB2, all of the objects included in the first object group OB1. Then, the CPU proceeds with the process to a step 995 to terminate executing the process of this routine once.

On the other hand, when the first number Na is greater than the predetermined upper limit number Nx, the situation corresponds to the above-described situation B. In this case, the CPU determines "No" at the step 901 and proceeds with the process to a step 903 to execute the routine shown in FIG. 10 as described later. The routine shown in FIG. 10 executes a process of selecting the second object group OB2. Then, the CPU proceeds with the process to the step 995 to terminate executing the process of this routine once.

Figure 10:
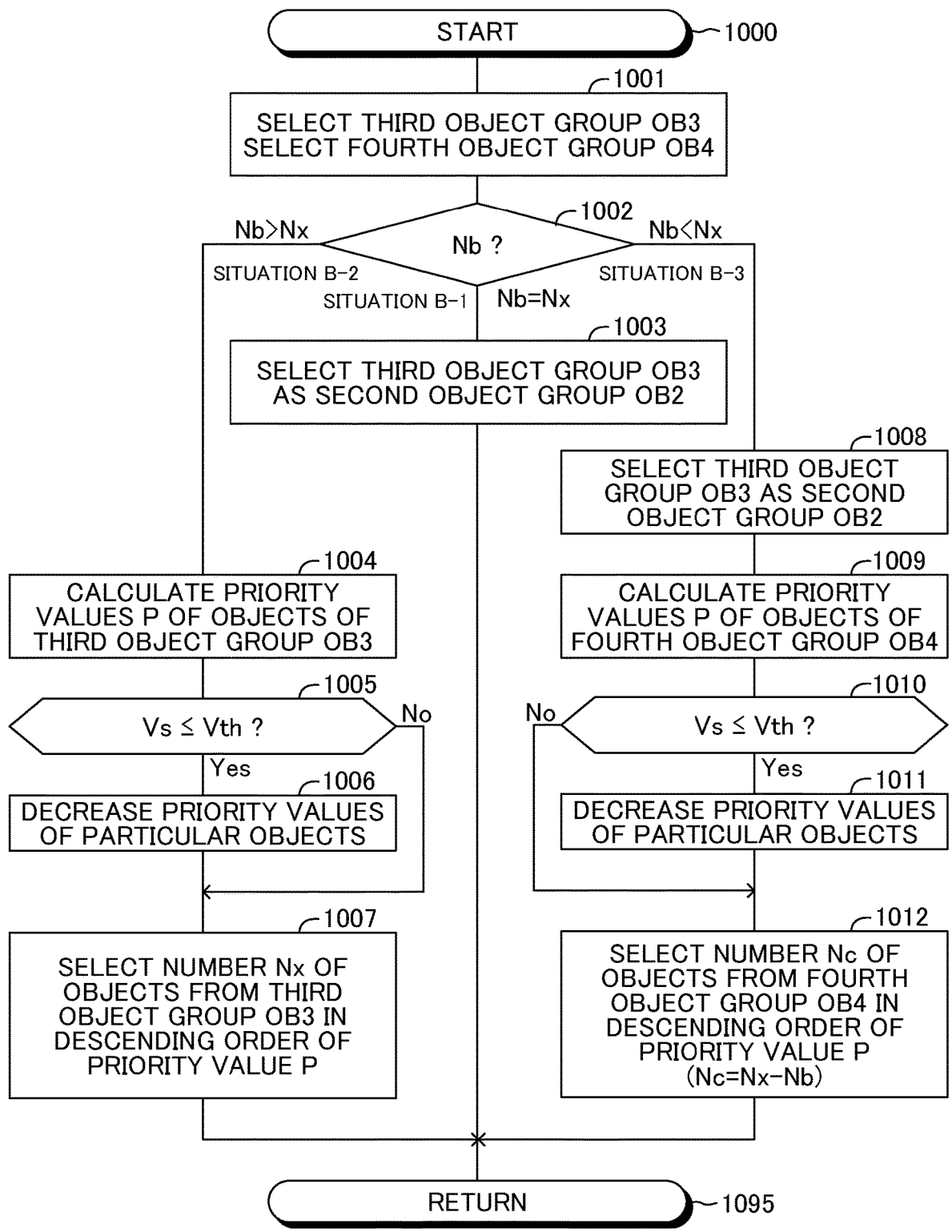
FIG. 10 is a view which shows a flowchart of a second object selection routine executed by the CPU of the collision avoidance ECU.

When the CPU proceeds with the process to the step 903 of the routine shown in FIG. 9, the CPU starts executing a process from a step 1000 of the routine shown in FIG. 10 and proceeds with the process to a step 1001. At the step 1001, the CPU selects, as the third object group OB3, the objects having the reliability values Rd equal to or greater than the predetermined reliability threshold Rth from the first object group OB1. In addition, the CPU selects, as the fourth object group OB4, the objects having the reliability values Rd smaller than the predetermined reliability threshold Rth from the first object group OB1.

Next, at a step 1002, the CPU compares the second number Nb and the predetermined upper limit number Nx. That is, the CPU determines which the current situation is, the situation B-1, or the situation B-2, or the situation B-3.

When the second number Nb is equal to the predetermined upper limit number Nx (i.e., Nb=Nx), the current situation corresponds to the situation B-1. In this case, the CPU proceeds with the process to a step 1003 to select, as the second object group OB2, all of the objects included in the third object group OB3. Then, the CPU proceeds with the process to a step 1095 to terminate executing the process of this routine once. Then, the CPU proceeds with the process to the step 995 of the routine shown in FIG. 9 from the step 903.

When the second number Nb is greater than the predetermined upper limit number Nx (i.e., Nb>Nx), the current situation corresponds to the situation B-2. In this case, the CPU proceeds with the process to a step 1004 from the step 1002 to calculate the priority values P of the objects included in the third object group OB3.

Next, the CPU proceeds with the process to a step 1005 to determine whether the moving speed Vs of the own vehicle VA is equal to or lower than the predetermined moving speed threshold Vth. When the moving speed Vs of the own vehicle VA is equal to or lower than the predetermined moving speed threshold Vth, the CPU determines "Yes" at the step 1005 and proceeds with the process to a step 1006. At the step 1006, the CPU decreases the priority values P of the particular objects included in the third object group OB3 by the predetermined value Pd. Next, the CPU proceeds with the process to a step 1007 to select, as the second object group OB2, the predetermined upper limit number Nx of the objects from the third object group OB3 in descending order of the priority value P. Then, the CPU proceeds with the process to the step 1095 to terminate executing the process of this routine once. Then, the CPU proceeds with the process to the step 995 of the routine shown in FIG. 9 from the step 903.

It should be noted that when the moving speed Vs of the own vehicle VA is not equal to or lower than the predetermined moving speed threshold Vth, the CPU determines "No" at the step 1005 and proceeds with the process to a step 1007. At the step 1007, the CPU selects, as the second object group OB2, the predetermined upper limit number Nx of the objects from the third object group OB3 in descending order of the priority value P.

When the second number Nb is smaller than the predetermined upper limit number Nx (i.e., Nb<Nx), the current situation corresponds to the situation B-3. In this case, the CPU proceeds with the process to a step 1008 from the step 1002 to select, as the second object group OB2, all of the objects included in the third object group OB3. Next, at a step 1009, the CPU calculates the priority values P of the objects included in the fourth object group OB4.

Next, at a step 1010, the CPU determines whether the moving speed Vs of the own vehicle VA is equal to or lower than the predetermined moving speed threshold Vth. When the moving speed Vs of the own vehicle VA is equal to or lower than the predetermined moving speed threshold Vth, the CPU determines "Yes" at the step 1010 and proceeds with the process to a step 1011. At the step 1011, the CPU decreases the priority values P of the particular objects included in the fourth object group OB4 by the predetermined value Pd. Next, the CPU proceeds with the process to a step 1012 to select, as the second object group OB2, the third number Nc (=Nx−Nb) of the objects from the fourth object group OB4 in descending order of the priority value P. Then, the CPU proceeds with the process to the step 1095 to terminate executing the process of this routine once. Then, the CPU proceeds with the process to the step 995 of the routine shown in FIG. 9 from the step 903.

It should be noted that when the moving speed Vs of the own vehicle VA is not equal to or lower than the predetermined moving speed threshold Vth, the CPU determines "No" at the step 1010 and proceeds with the process to a step 1012. At the step 1012, the CPU selects, as the second object group OB2, the third number Nc of the objects from the fourth object group OB4 in descending order of the priority value P.

Figure 11:
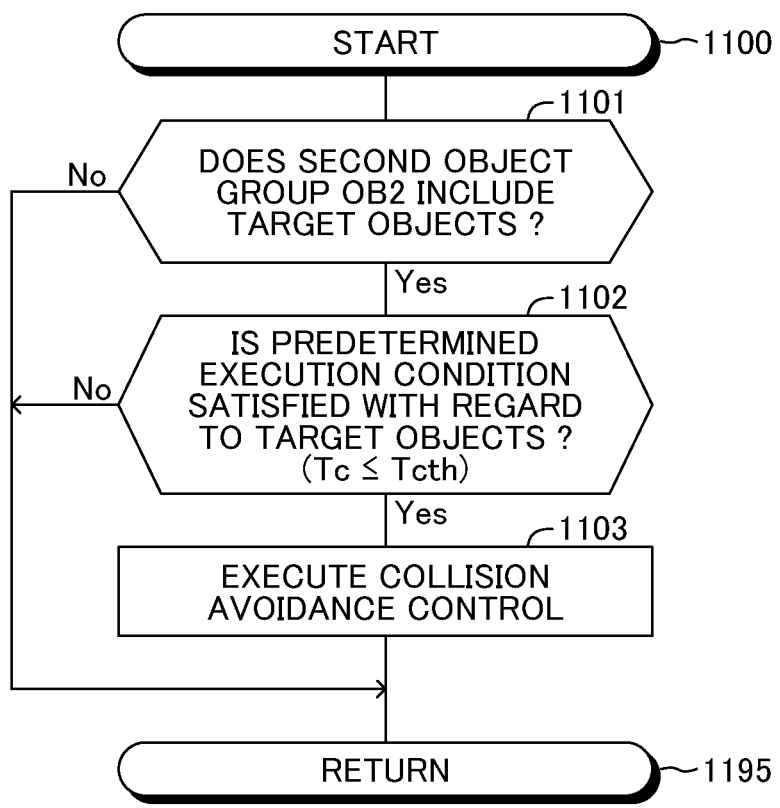
FIG. 11 is a view which shows a flowchart of a collision avoidance control execution routine executed by the CPU of the collision avoidance ECU.

In addition, at a predetermined timing, the CPU starts executing a process from a step 1100 of the routine shown in FIG. 11 and proceeds with the process to a step 1101 to determine whether the second object group OB2 includes the target objects. In particular, the CPU determines whether the second object group OB2 includes the target objects, using the information on the two dimension coordinate system as described above. When the second object group OB2 does not include any target objects, the CPU determines "No" at the step 1101 and proceeds with the process to a step 1195 to terminate executing the process of this routine once.

On the other hand, when the second object group OB2 includes at least one target object, the CPU determines "Yes" at the step 1101 and proceeds with the process to a step 1102 to determine whether the predetermined execution condition is satisfied with regard to the target objects. In particular, the CPU determines whether the time Tc is equal to or shorter than the predetermined time threshold Tcth. When the predetermined execution condition is not satisfied, the CPU determines "No" at the step 1102 and proceeds with the process directly to the step 1195 to terminate executing the process of this routine once.

On the other hand, when the predetermined execution condition is satisfied, the CPU determines "Yes" at the step 1102 and proceeds with the process to a step 1103 to execute the collision avoidance control. Then, the CPU proceeds with the process to the step 1195 to terminate executing the process of this routine once.

The vehicle control apparatus configured as described above can provide following effects. When the own vehicle VA moves at the low speed, and the particular object (the pedestrian) moves at a speed lower than the moving speed of the four-wheel vehicle, a probability that the particular object (the pedestrian) collides with the own vehicle VA, is low. Accordingly, when the moving speed Vs of the own vehicle VA is equal to or lower than the predetermined moving speed threshold Vth, the vehicle control apparatus decreases the priority value P of the particular object by the predetermined value Pd. Thus, when the vehicle control apparatus limits the number of the objects included in the second object group OB2 to the predetermined upper limit number Nx, the vehicle control apparatus can reduce a possibility that the particular object is selected as the second object group OB2. Thus, the vehicle control apparatus can select, as the second object group OB2, the object which probably collides with the own vehicle VA. Thus, the vehicle control apparatus can execute the calculation process for the collision avoidance control with regard to the object probably colliding with the own vehicle VA with the reduced load of the calculation process.

It should be noted that the invention is not limited to the aforementioned embodiments, and various modifications can be employed within the scope of the invention.

Modified Example 1

In the above-described embodiment, the ECU 10 is configured to select the second object group OB2 from the third object group OB3 and/or the fourth object group OB4. However, the invention is not limited to this embodiment. The ECU 10 may be configured to select the second object group OB2 directly from the first object group OB1 as described below. The ECU 10 selects the first object group OB1 and then calculates the priority values P of the objects included in the first object group OB1. When the first number Na is greater than the predetermined upper limit number Nx, the ECU 10 selects, as the second object group OB2, the predetermined upper limit number Nx of the objects from the first object group OB1 in descending order of the priority value P. In this case, when the moving speed Vs of the own vehicle VA is equal to or lower than the predetermined moving speed threshold Vth, the ECU 10 decreases the priority values P of the particular objects included in the first object group OB1. With the vehicle control apparatus configured as such, the ECU 10 can reduce a possibility that the particular objects included in the first object group OB1 are selected as the second object group OB2.

Modified Example 2

Further, the particular object is an object which is deemed as an object moving at a speed lower than the moving speed of the four-wheel vehicle. Thus, the particular object may be a bicycle.

Modified Example 3

Furthermore, the method of calculating the priority value P is not limited to the examples described above. The ECU 10 is configured to acquire the priority value P, based on a distance dw between the own vehicle VA and the object on the two dimension coordinate system. In the example shown in FIG. 6, the ECU 10 may acquire the priority value P of the first other vehicle OV1 as described below. The ECU 10 calculates the distance dw between the center position O of the own vehicle VA and the particular position 420a of the first other vehicle OV1. Then, the ECU 10 acquires the priority value P by applying the distance dw to a predetermined second priority map Map2(dw). The predetermined priority map Map2(dw) defines a relationship between the distance dw and the priority value P. As the distance dw decreases, the priority value P increases.

In the example shown in FIG. 6, the ECU 10 may acquire the priority value P of the first other vehicle OV1 as described below. The ECU 10 acquire the time Tc required for the center position O of the own vehicle VA to reach the crossing position ps1. Then, the ECU 10 acquires the priority value P by applying the time Tc to a predetermined third priority map Map3(Tc). The predetermined third priority map Map3(Tc) defines a relationship between the time Tc and the priority value P. As the time Tc decreases, the priority value P increases.

The ECU 10 may be configured to acquire the priority value P of the first other vehicle OV1, based on a moving state such as the moving speed of the first other vehicle OV1. Further, the ECU 10 may be configured to acquire the priority value P of the first other vehicle OV1, based on a relative moving speed Vfx of the first other vehicle OV1 with respect to the own vehicle VA.

Modified Example 4

Furthermore, the ECU 10 may be configured to change the predetermined value Pd, depending on the moving speed of the particular object in the moving direction of the particular object when the ECU 10 decreases the priority value P of the particular object. For example, the ECU 10 may change the predetermined value Pd such that the predetermined value Pd increases as the moving speed of the particular object decreases. This means that the probability that the particular object collides with the own vehicle VA is low when the moving speed of the particular object is low.

Modified Example 5

Furthermore, a shape of the selection area As is not limited to one described above. The selection area As may have a shape other than the shape of the selection area As described above as far as the objects moving toward the own vehicle VA from the right side area of the own vehicle VA and the objects moving toward the own vehicle VA from the left side area of the own vehicle VA are selected or picked up.

Modified Example 6

Furthermore, the ECU 10 may be configured to exclude the object having the low probability of colliding with the own vehicle VA (for example, the first pedestrian PE1 in the example shown in FIG. 5) from the first object group OB1 before the ECU 10 selects the second object group OB2 (for example, before the ECU 10 starts executing the process of the routine shown in FIG. 10).

Modified Example 7

Furthermore, the surrounding sensors 14 may include sensors other than the radar sensors. In this regard, the surrounding sensors 14 may further include LiDAR (Light Detection and Ranging/Laser Imaging Detection and Ranging) and/or camera sensors. The camera sensor acquires image data of the surrounding area around the own vehicle VA. The camera sensor may be configured to store paten data of the objects such as the four-wheel vehicles and the pedestrians in advance. Further, the camera sensor may be configured to determine which the object is, the four-wheel vehicle or the pedestrian (the particular object) by carrying out a pattern matching with the image data.

Modified Example 8

Furthermore, the predetermined execution condition is not limited to one described above. In this regard, the index value representing the collision probability of the object may be the distance ds. In this case, the predetermined execution condition may be a condition that the distance ds is equal to or shorter than a predetermined distance threshold dsth.

What is claimed is:
1. A vehicle control apparatus, comprising:
at least one first sensor which acquires object information on objects in a surrounding area around an own vehicle;
a second sensor which detects a moving speed of the own vehicle; and
an electronic control unit configured to:
 select, as a first object group, objects in a predetermined area from objects included in the object information;
 select, as a second object group, a predetermined upper limit number of the objects from the first object group in descending order of a priority value when the number as a first number of the objects included in the first object group is greater than the predetermined upper limit number; and
 execute a collision avoidance control when an index value representing a collision probability that the own vehicle collides with the object included in the second object group, satisfies a predetermined condition,
wherein the priority value represents a probability that the own vehicle collides with the object,
wherein the electronic control unit is configured to reduce the priority value of a particular object included in the first object group when the moving speed of the own vehicle is equal to or lower than a predetermined moving speed threshold, and
wherein the particular object is an object which is deemed to have a moving speed lower than a moving speed of a four-wheel vehicle.
2. The vehicle control apparatus as set forth in claim 1,
wherein the electronic control unit is configured to calculate a reliability value of each of the objects included in the first object group,
wherein the reliability value represents a probability that the object actually exists,
wherein the electronic control unit is configured to select, as a third object group, the objects each having the reliability value equal to or greater than a predetermined reliability threshold from the first object group when the first number is greater than the predetermined upper limit number,
wherein the electronic control unit is configured to select, as the second object group, the predetermined upper limit number of the objects in descending order of the priority value from the third object group when the number as a second number of the objects included in the third object group is greater than the predetermined upper limit number, and
wherein the electronic control unit is configured to reduce the priority value of the particular object included in the third object group when the moving speed of the own vehicle is equal to or lower than the predetermined moving speed threshold.
3. The vehicle control apparatus as set forth in claim 2,
wherein the electronic control unit is configured to select, as a fourth object group, the objects each having the reliability value smaller than the predetermined reliability threshold from the first object group when the first number is greater than the predetermined upper limit number, wherein the electronic control unit is configured to select the third object group as the second object group when the second number is smaller than the predetermined upper number and thereafter select, as the second object group, a third number of the objects in descending order of the priority value from the fourth object group, wherein the third number is a difference between the first number and the second number, and wherein the electronic control unit is configured to reduce the priority value of the particular object included in the fourth object group when the moving speed of the own vehicle is equal to or lower than the predetermined moving speed threshold.

4. The vehicle control apparatus as set forth in claim 1, wherein the particular object is a pedestrian.

5. The vehicle control apparatus as set forth in claim 1,
wherein the first sensor is configured to transmit electromagnetic waves and detects the objects by using information on reflection points by which the electromagnetic waves are reflected, and wherein the first sensor is configured to determine the object corresponding to the reflection points as the particular object when a reflection strength at the reflection point is equal to or smaller than a predetermined strength threshold.

6. The vehicle control apparatus as set forth in claim 1, wherein the electronic control unit is configured to acquire the priority value, based on a distance between the own vehicle and a predicted moving route of the object or a distance between the own vehicle and the object.

* * * * *